(12) United States Patent
Oswald

(10) Patent No.: US 7,029,211 B2
(45) Date of Patent: Apr. 18, 2006

(54) PIPE CHAMFER TOOL

(76) Inventor: Friedrich Oswald, 470 Main Street West, Grimsby, Ontario (CA) L3M 1T3

( * ) Notice: Subject to any disclaimer, the term of this patent is extended or adjusted under 35 U.S.C. 154(b) by 205 days.

(21) Appl. No.: 10/693,861

(22) Filed: Oct. 28, 2003

(65) Prior Publication Data

US 2004/0226423 A1 Nov. 18, 2004

Related U.S. Application Data

(60) Provisional application No. 60/425,283, filed on Nov. 12, 2002.

(51) Int. Cl.
B23B 5/16 (2006.01)

(52) U.S. Cl. .................. 408/211; 408/223; 408/713

(58) Field of Classification Search ............ 408/211, 408/223, 227, 238, 713, 231; 82/113
See application file for complete search history.

(56) References Cited

U.S. PATENT DOCUMENTS

| | | | | |
|---|---|---|---|---|
| 1,563,260 A | * | 11/1925 | Cromley | 408/216 |
| 2,470,392 A | * | 5/1949 | Gassmann | 408/201 |
| 2,583,246 A | * | 1/1952 | Williams | 408/211 |
| 3,138,044 A | * | 6/1964 | Olexson | 408/200 |
| 3,595,107 A | * | 7/1971 | Dackow | 82/113 |
| 3,661,472 A | * | 5/1972 | Beauloye | 408/231 |
| 3,807,258 A | * | 4/1974 | Bjalme | 82/113 |
| 4,274,770 A | * | 6/1981 | Singer | 408/211 |
| 4,586,408 A | * | 5/1986 | Goldner | 82/114 |
| 5,351,587 A | * | 10/1994 | Griffin | 82/113 |
| 5,853,272 A | * | 12/1998 | Wartluft et al. | 408/199 |
| 6,227,083 B1 | * | 5/2001 | Tseng | 82/113 |

FOREIGN PATENT DOCUMENTS

| | | | |
|---|---|---|---|
| EP | 0152659 | * | 8/1985 |
| EP | 1059135 | * | 12/2000 |
| GB | 1462926 | * | 1/1977 |
| GB | 2234697 | * | 2/1991 |
| JP | 2000-71101 | * | 3/2000 |
| JP | 2000-71102 | * | 3/2000 |

\* cited by examiner

Primary Examiner—Daniel W. Howell

(57) ABSTRACT

The present invention a pipe chamfer tool including a body having at least one aperture defined therein, the aperture sized and adapted to slidably receive a pipe. The chamfer tool further includes a cutting blade housed in the body defining at least one cutting surface for chamfering a pipe end. The cutting blade oriented such that a pipe end received within an aperture simultaneously impinges on one of the cutting surfaces and a stop surface wherein the stop surface positioned at a preselected offset distance; and wherein a pipe end is chamfered by rotating a pipe or rotating the body thereby cutting a pipe end to a chamfer. The chamfer tool includes a cutting blade having a planar blade portion having top and bottom surfaces with V shaped cutting surfaces defined along a front edge of the blade wherein the V shaped cutting surfaces positioned adjacent each other along the front edge of the blade.

9 Claims, 5 Drawing Sheets

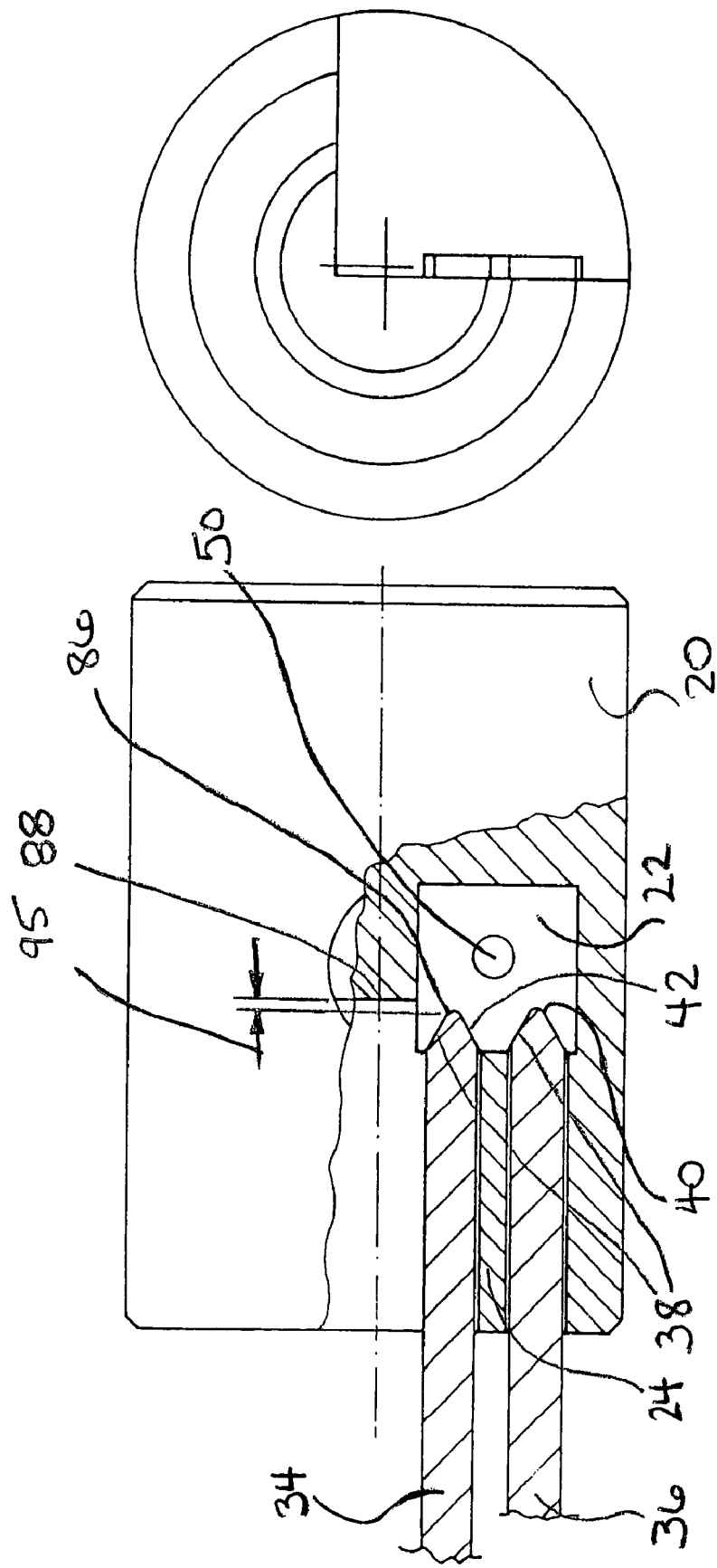

PIPE CHAMFER TOOL

This application claims benefit of Provisional No. 60/425,283 filed Nov. 12, 2002.

FIELD OF THE INVENTION

The present invention relates to pipe chamfering tools and more particularly relates to a multi-purpose pipe chamfering tool for plastic pipes.

BACKGROUND OF THE INVENTION

Plastic pipes are used in a variety of industries and more particularly, plastic pipes have been gained popularity for use in the distribution of natural gas. When installing natural gas pipelines, often they are fitted together and/or interconnected with other pipes, at which times various fittings need to be placed and/or crimped over the end of the plastic pipes. In order to ensure that the fittings to be placed over the ends of the plastic pipes fit properly and provide a good seal, the ends of the pipes must be squared off and often the ends must be rounded and or chamfered to ensure that the pipe fitting can be placed over easily and without damage. Frequently, the pipe fittings contain O-rings for sealing off and ensuring that there is no leakage of the natural gas from the plastic piping and these O-rings in particular are very sensitive to sharp edges and/or burrs on the ends. Therefore, chamfering of the ends is mandatory in order to ensure that when fittings are placed over the end of the plastic pipes, the O-rings are not damaged, but rather slide smoothly and easily over the end.

SUMMARY OF THE INVENTION

The present invention a pipe chamfer tool comprises:
(a) a body having at least one aperture defined therein;
(b) a cutting blade housed in the body defining at least one cutting surface for shaving or chamfering a pipe end.
(c) wherein a pipe is slideably received within the aperture and impinges on the cutting surface and also a stop surface positioned at a preselected offset distance.
(d) wherein the pipe end is chamfered by rotating the pipe or rotating the body thereby cutting the end to a chamfer.

In another embodiment the pipe chamfer tool comprises:
(a) a body including at least one aperture defined therein, the aperture sized and adapted to slidably receive a pipe;
(b) a cutting blade housed in the body defining at least one cutting surface for chamfering a pipe end, the cutting blade oriented such that a pipe end received within an aperture simultaneously impinges on one of the cutting surfaces and a stop surface;
(c) wherein the stop surface positioned at a preselected offset distance; and
(d) wherein a pipe end is chamfered by rotating a pipe or rotating the body thereby cutting a pipe end to a chamfer.

In another embodiment the pipe chamfer tool comprises:
(a) a body including at least two apertures defined therein, the apertures sized and adapted to slidably receive pipes of differing sizes;
(b) a cutting blade housed in the body defining at least two cutting surfaces for chamfering a pipe end, the cutting blade oriented such that a pipe end received within an aperture simultaneously impinges on one of the cutting surfaces and a stop surface;
(c) wherein the stop surface positioned at a preselected offset distance; and
(d) wherein a pipe end is chamfered by rotating a pipe or rotating the body thereby cutting a pipe end to a chamfer.

Preferably wherein the cutting blade including a planar blade portion having top and bottom surfaces with V shaped cutting surfaces defined along a front edge of the blade.

Preferably wherein the cutting blade including a substantially rectangular shaped planer blade portion with the V shaped cutting surfaces positioned adjacent each other along the front edge of the blade.

Preferably wherein the cutting blade wherein the V shaped cutting surfaces including a preselected chamfer depth.

Preferably wherein the body including a pipe guide positioned between apertures for guiding pipes as they are slidably received along the apertures.

Preferably wherein the apertures being concentrically nested tubular shaped holes defined within the body each aperture corresponding to a different pipe size.

Preferably wherein the outer apertures being concentrically nested tubular shaped holes defined within the body and the innermost aperture being a concentric cylindrical shaped hole within the body.

Preferably wherein the body having two apertures, an outer aperture being a concentric tubular shaped hole defined within the body and an inner aperture being a concentric cylindrical shaped hole within the body wherein the outer and inner aperture separated by a pipe guide.

Preferably wherein the cutting blade including two cutting surfaces, an inner and an outer cutting surface dimensioned and adapted to chamfer a pipe end received within the corresponding inner and outer any apertures.

Preferably wherein the offset distance is selected to be the longitudinal distance between the chamfer tip and the stop surface and is selected such that a pipe end is squared up evenly.

BRIEF DESCRIPTION OF THE DRAWINGS

The present invention will described by example only in which reference will be made to the following drawings.

FIG. 2 is a partial cut away top plan view of the present invention a pipe chamfer tool.

FIG. 3 is a schematic cross sectional view of the pipe chamfer tool showing the blade and pipe guide details.

DETAILED DESCRIPTION OF THE PREFERRED EMBODIMENT

Figure 1:
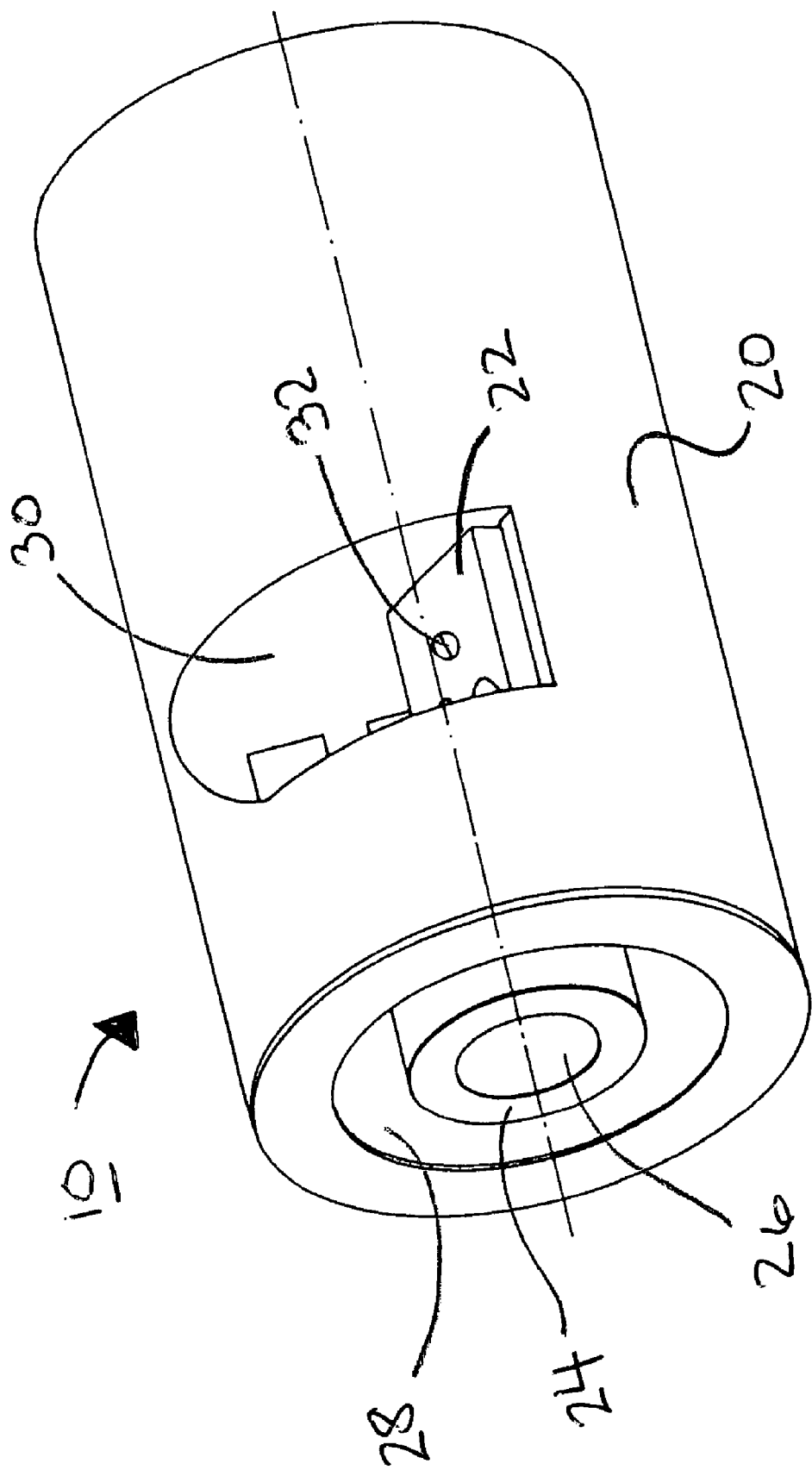
FIG. 1 is a front schematic perspective view of the present invention a pipe chamfer tool.

The present invention a pipe chamfer tool shown generally as 10 in the attached Figures includes the following major components. Pipe chamfer tool 10 includes a body 20, a blade 22, pipe guide 24, an inner aperture 26, an outer aperture 28, viewing window 30, and a fastening screw 32 for holding blade 22 in place.

Blade 22 includes the following major portions, namely V-shaped outer cutting surface 40, V-shaped inner cutting surface 42, fastening hole 50 for receiving fastening screw 32 there through.

Body 20 is preferably made of metal such as aluminum and/or steel, however can also be constructed out of suitable plastic materials.

Blade 22 is preferably made of hardened tool steel, however can also be made out of milder steels and/or other suitable cutting materials, such as ceramics and/or hardened aluminum known in the art to those familiar with cutting tools.

In Use

Figure 4:
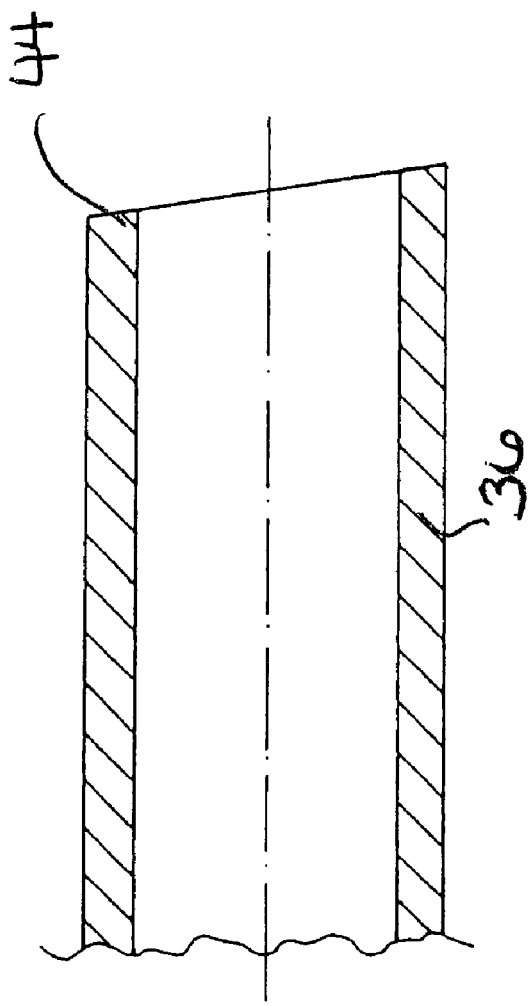
FIG. 4 is a schematic cross sectional longitudinal view of a pipe in the non chamfer condition.
Figure 5:
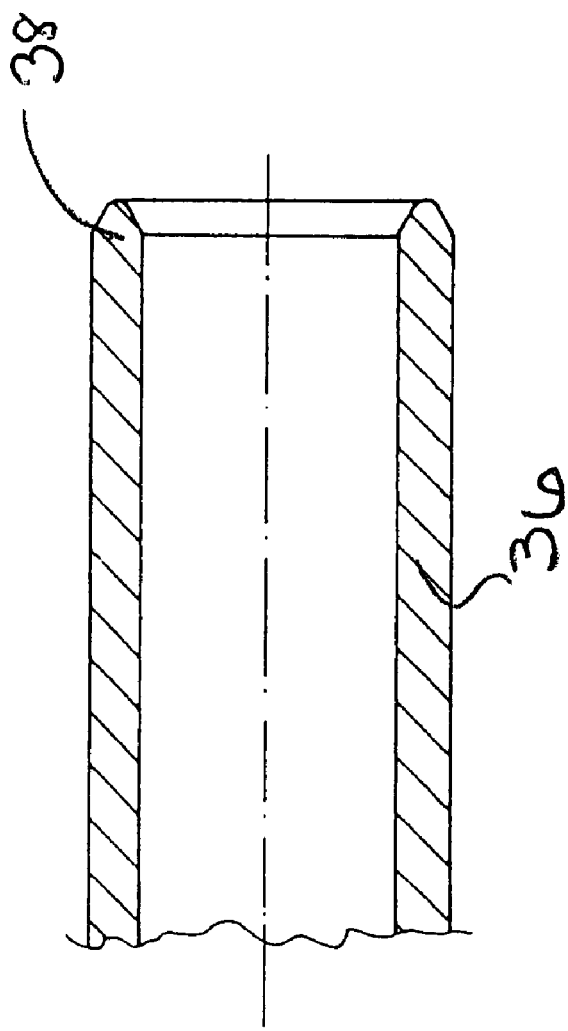
FIG. 5 is a cross sectional longitudinal view of a pipe showing in the chamfer condition.

Pipe chamfer tool 10 depicted in the drawings is used to chamfer an end of a pipe for placement of fittings thereon afterwards. Referring to FIGS. 4 and 5, FIG. 4 shows the end of a pipe which normally has an irregular squared off end which is not suitable for placing fitting there over. A pipe 36 is placed into either outer aperture 28 or inner aperture 26 depending upon the diameter of the pipe. Pipe chamfer tool 10 is rotated and the pipe 36 held stationary or the pipe 36 itself is rotated and pipe chamfer tool 10 is held stationary in order to chamfer the end of the pipe. Turning or rotating the tool or the pipe results in chamfer end 38 as shown in FIG. 5.

The reader will note that both the inner and outer diameter of the pipe is chamfered such that there is a double chamfer cut into the pipe end, thereby producing almost a V shaped end onto pipe 36. Pipe 36 can be any type of commercially available plastic pipe, but more specifically tool 10 is designed for chamfering the ends of plastic piping that is used in the natural gas industry.

The ends of pipe 36 are chamfered in order to place fittings over the end. These fittings often include O-rings which are very sensitive to abrasion and therefore, the ends of pipe 36 need to be chamfered or rounded over such that when fittings are placed onto the end of pipe 36, the fittings and the O-rings located within the fittings and not shown in the drawings, can be placed over pipe 36 without damaging the pipe fittings and/or the O-rings.

In practise chamfered end 38 is found to work very well to allow easy slipping of the pipe fittings over the end of pipe 36 without damaging either the pipe fitting or the O-rings contained within the fitting.

Figure 6:
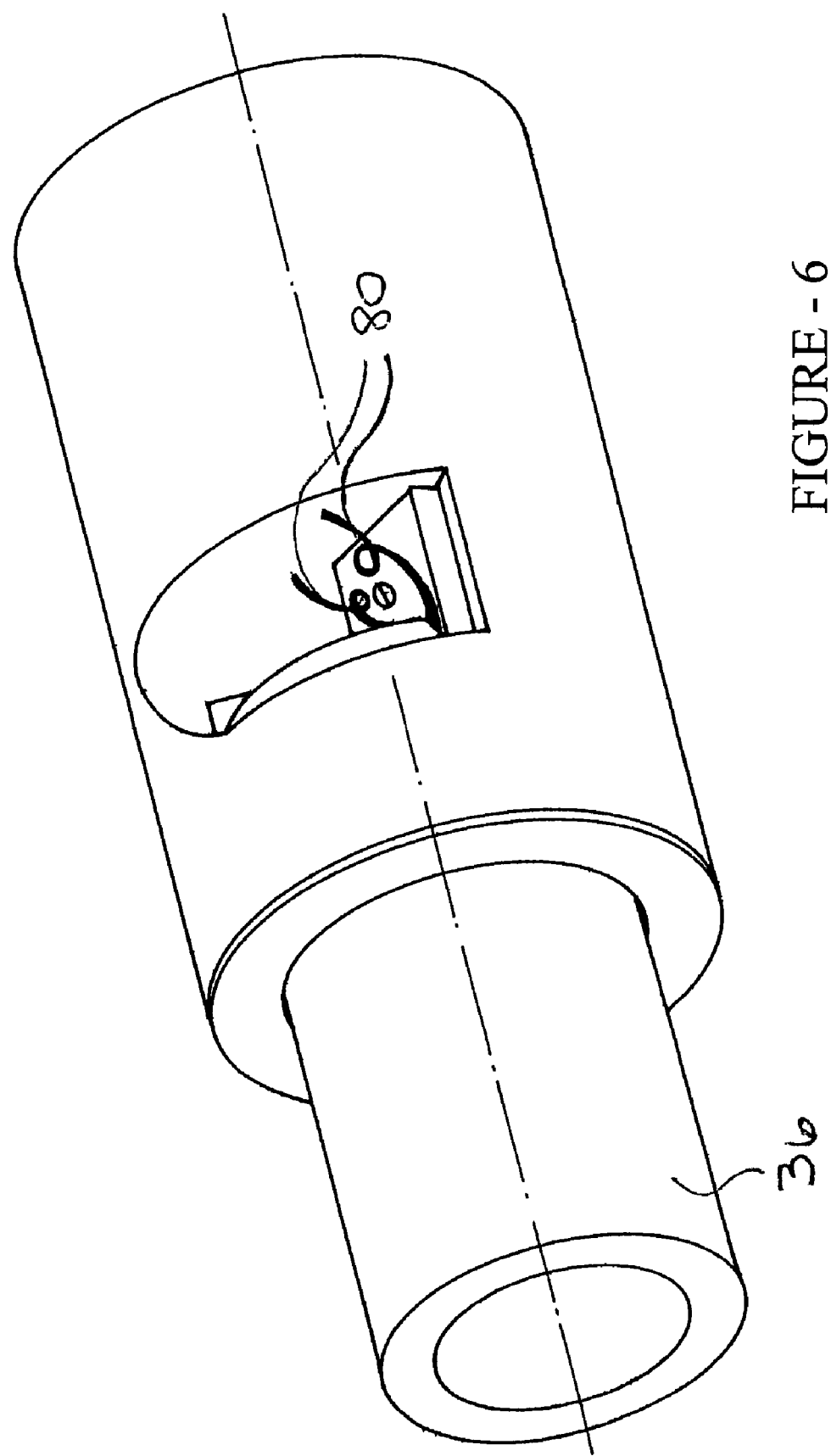
FIG. 6 is a schematic perspective front view of the pipe chamfer tool, together with a large diameter pipe being chamfer.

FIG. 6 for example shows a large diameter pipe 36 placed into outer aperture 28 of pipe chamfer tool 10 for making contact with outer cutting surface 40 of blade 22. By turning either the pipe chamfer tool 10 or the pipe 36, the end of pipe 36 can be chamfered by cutting or shaving a chamfered contoured onto the end of pipe 36 namely chamfered end 38. The pipe ends take on the contour of the outer cutting surface 40, or the inner cutting surface 42 of blade 22. The outer cutting surface 40 and the inner cutting surface 42 of blade 22 are V-shaped in nature forming approximately a 60° angle, however in practice, other angles may also work equally well. Blade 22 includes a fastening hole 50 for fastening blade 22 onto body 20 using fastening screw 32.

Each cutting tool is designed to chamfer two distinct diameters of piping, namely a larger diameter pipe 26 which fits in outer aperture 28 which is defined by the inside of body 20 and the outside diameter of pipe guide 24. In FIG. 2 this is depicted as a large diameter pipe 36 being chamfered with outer cutting surface 40 of blade 22 thereby creating chamfered end 38.

A smaller diameter pipe 34 can also be accommodated within pipe guide 24, which defines inner aperture 26. In this case the outer diameter of smaller diameter pipe 34 follows along the inner diameter of inner aperture 26 and the end of smaller diameter pipe 34 impinges upon inner cutting surface 42 thereby creating a chamfered end 38 as depicted in FIG. 2. The reader will note that different sized pipes are not usually sharpened simultaneously. The purpose of FIG. 2 is to show that either a pipe can be placed into the inner aperture 26 having a small diameter pipe 34 placed therein and/or a larger diameter pipe 36 can be placed in outer aperture 28. Therefore, a person skilled in the art will note that this is a multi use tool in that it can chamfer the ends of either a larger diameter pipe 36 and/or a smaller diameter pipe 34 and therefore can be used for two distinct sizes of pipe. By way of example only a ½" diameter pipe and 1" diameter pipe could be sharpened with a tool such as pipe chamfer tool 10.

By rotating larger diameter pipe 36, shavings 80 come off of blade 22, as the end is chamfered. The portion of the end that is not being cut by blade 22 may butt up against stop surface 88 which is slightly deeper than chamfered tip 86 of blade 22, thereby ensuring that even an unevenly squared off pipe as depicted in FIG. 4 can be evened up and chamfered to a pipe shown as in condition FIG. 5. The offset distance 95 is the longitudinal distance between the chamfer tip 86 of the blade 22 and the stop surface 88. By ensuring that stop surface 88 is just slightly deeper by an offset distance 95 than chamfer tip 86 on blade 22, an uneven pipe will become even or squared up as shown in FIG. 5 since the stop surface 88 will ensure that the out of round or off square pipe end as shown in FIG. 4 will be evenly chamfered by taking off more of the longer side as depicted in FIG. 4 and less on the shorter side until the entire pipe end is squared up evenly.

Figure 7:
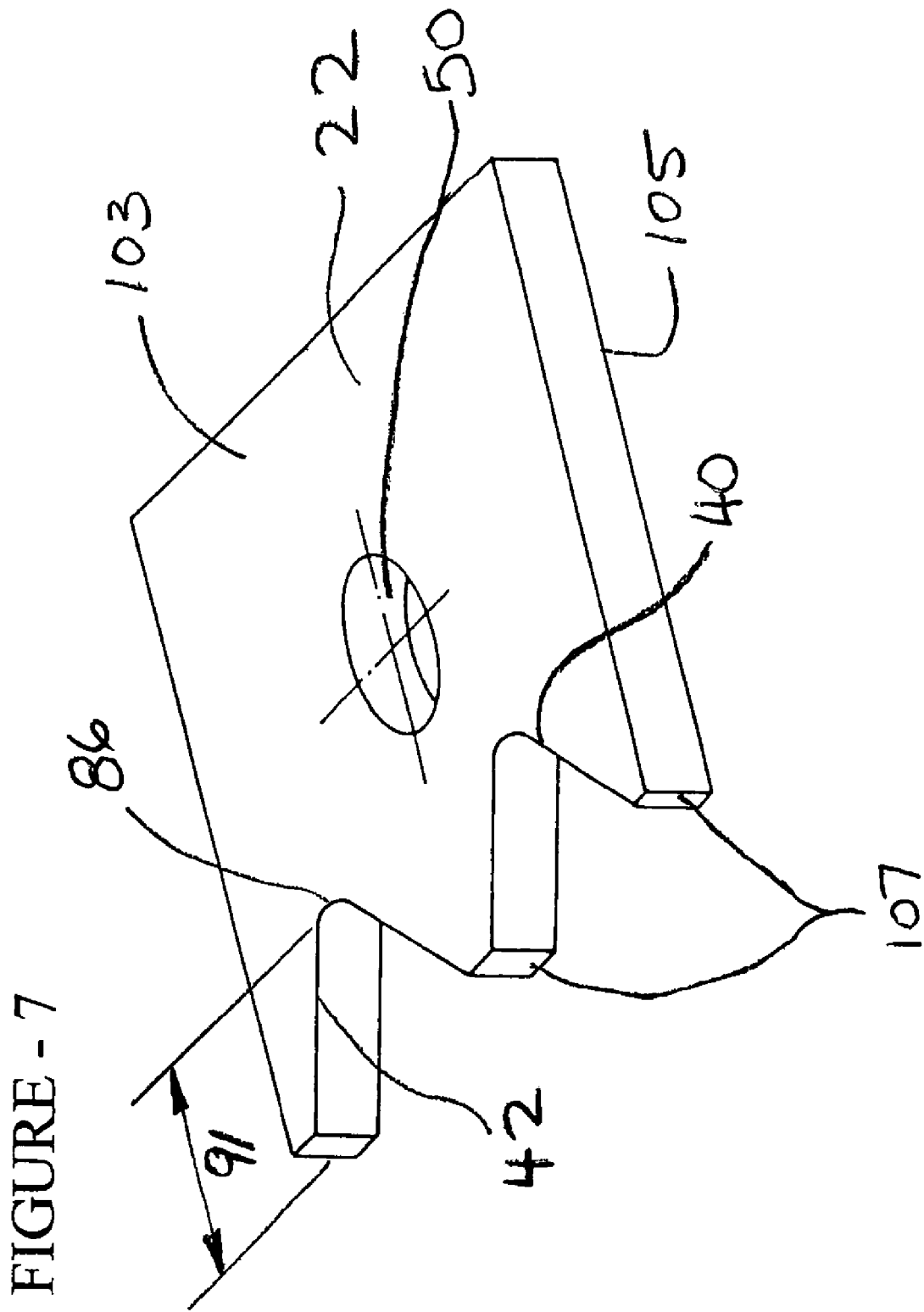
FIG. 7 is a top schematic perspective view of the blade details.

Referring to FIG. 7 blade 22 preferably is a rectangular or square planar shaped blade having a top surface 103 and a bottom surface 105 and a front edge 107. Cutting surfaces 40 and 42 are positioned adjacent each other along the front edge 107 and have a chamfer depth of 91. The chamfer depth is selected depending upon the thickness of the pipe wall and the chamfer radius required for the application.

Pipe chamfer tool 10 is designed such that blade 22 can be easily replaced by removing fastening screw 32 and therefore placing a new sharp cutting blade into pipe chamfer tool 10.

It should be apparent to persons skilled in the arts that various modifications and adaptation of this structure described above are possible without departure from the spirit of the invention the scope of which defined in the appended claim.

I claim:

1. A pipe chamfer tool comprising:
   (a) a body including at least two apertures defined therein, said apertures sized and adapted to slidably receive pipes of differing sizes;
   (b) a cutting blade housed in said body defining at least two cutting surfaces for chamfering a pipe end, said cutting blade oriented such that a pipe end received within an aperture simultaneously impinges on one of said cutting surfaces and a stop surface;
   (c) wherein said stop surface positioned at a preselected offset distance; and (d) wherein a pipe end is chamfered by rotating a pipe or rotating said body thereby cutting a pipe end to a chamfer;

(e) wherein the body having two apertures, an outer aperture being a concentric tubular shaped hole defined within the body and an inner aperture being a concentric cylindrical shaped hole within the body wherein said outer and inner aperture separated by a pipe guide; and (f) wherein said cutting blade including two cutting surfaces, an inner and an outer cutting surface dimensioned and adapted to chamfer a pipe end received within the corresponding inner and outer any apertures.

2. The pipe chamfer tool claimed in claim 1 wherein the cutting blade including a planar blade portion having top and bottom surfaces with V shaped cutting surfaces defined along a front edge of the blade.

3. The pipe chamfer tool claimed in claim 2 wherein the cutting blade including a substantially rectangular shaped planer blade portion with the V shaped cutting surfaces positioned adjacent each other along the front edge of the blade.

4. The pipe chamfer tool claimed in claim 2 wherein the cutting blade including a substantially square shaped planer blade portion with the V shaped cutting surfaces positioned adjacent each other along the front edge of the blade.

5. The pipe chamfer tool claimed in claim 2 wherein, the cutting blade wherein said V shaped cutting surfaces including a preselected chamfer depth.

6. The pipe chamfer tool claimed in claim 1 wherein the body including a pipe guide positioned between apertures for guiding pipes as they are slidably received along the apertures.

7. The pipe chamfer tool claimed in claim 1 wherein the apertures being concentrically nested tubular shaped holes defined within the body each aperture corresponding to a different pipe size.

8. The pipe chamfer tool claimed in claim 1 wherein the outer apertures being concentrically nested tubular shaped holes defined within the body and the innermost aperture being a concentric cylindrical shaped hole within the body.

9. The pipe chamfer tool claimed in claim 1 wherein the offset distance is selected to be the longitudinal distance between the chamfer tip of the blade and the stop surface and is selected such tat a pipe end is squared up evenly upon chamfering.

* * * * *